US009669771B1

(12) United States Patent
Helm

(10) Patent No.: US 9,669,771 B1
(45) Date of Patent: Jun. 6, 2017

(54) GRAVITY MOUNT AND ROTATIONAL SECUREMENT FOR SENSING ELEMENT

(71) Applicant: Toyota Motor Engineering & Manufacturing North America, Inc., Erlanger, KY (US)

(72) Inventor: Sean L. Helm, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/048,770

(22) Filed: Feb. 19, 2016

(51) Int. Cl.
| | |
|---|---|
| *B60R 11/00* | (2006.01) |
| *B62D 33/03* | (2006.01) |
| *B60R 11/04* | (2006.01) |
| *B62D 33/027* | (2006.01) |
| *F16C 11/10* | (2006.01) |
| *B60R 1/00* | (2006.01) |

(52) U.S. Cl.
CPC .......... *B60R 11/04* (2013.01); *B62D 33/0273* (2013.01); *F16C 11/10* (2013.01); *B60R 1/00* (2013.01); *B60R 2011/004* (2013.01); *B60R 2011/0085* (2013.01); *B60R 2300/8046* (2013.01)

(58) Field of Classification Search
CPC ........ B62D 33/03; H04N 7/183; B60R 11/00; B60R 11/04; B60R 2300/802
USPC .......................................... 396/428; 348/148
See application file for complete search history.

(56) References Cited

U.S. PATENT DOCUMENTS

| | | | | |
|---|---|---|---|---|
| 9,321,410 | B2 * | 4/2016 | Hansen | B60R 11/04 |
| 9,457,733 | B2 * | 10/2016 | Schutz | B60R 11/04 |
| 2008/0180526 | A1 | 7/2008 | Trevino | |
| 2009/0231430 | A1 * | 9/2009 | Buschmann | B60Q 1/0023 |
| | | | | 348/148 |
| 2009/0309971 | A1 * | 12/2009 | Schuetz | B60R 11/04 |
| | | | | 348/148 |
| 2010/0040361 | A1 * | 2/2010 | Schuetz | B60R 11/04 |
| | | | | 396/428 |
| 2013/0235204 | A1 * | 9/2013 | Buschmann | B60R 11/04 |
| | | | | 348/148 |
| 2014/0197649 | A1 | 7/2014 | Hansen | |
| 2015/0008300 | A1 | 1/2015 | Jagoda | |
| 2015/0183380 | A1 * | 7/2015 | Da Deppo | H04N 7/183 |
| | | | | 348/148 |

FOREIGN PATENT DOCUMENTS

DE  102010005313 A1  8/2010

* cited by examiner

*Primary Examiner* — Dennis H Pedder
(74) *Attorney, Agent, or Firm* — Christopher G. Darrow; Darrow Mustafa PC

(57) ABSTRACT

An apparatus structured for installation in a component of a vehicle is provided. The component is rotatable to any of a plurality of angular orientations relative to a remainder of the vehicle. The apparatus includes a sensing element and mounting means structured for coupling to the component so as to move with the component. The mounting means is also structured for operative coupling to the sensing element so as to enable free rotation of the sensing element with respect to the mounting means. Retention means is provided and is structured for coupling to the component. The retention means is operable to prevent rotation of the sensing element with respect to the mounting means.

18 Claims, 4 Drawing Sheets

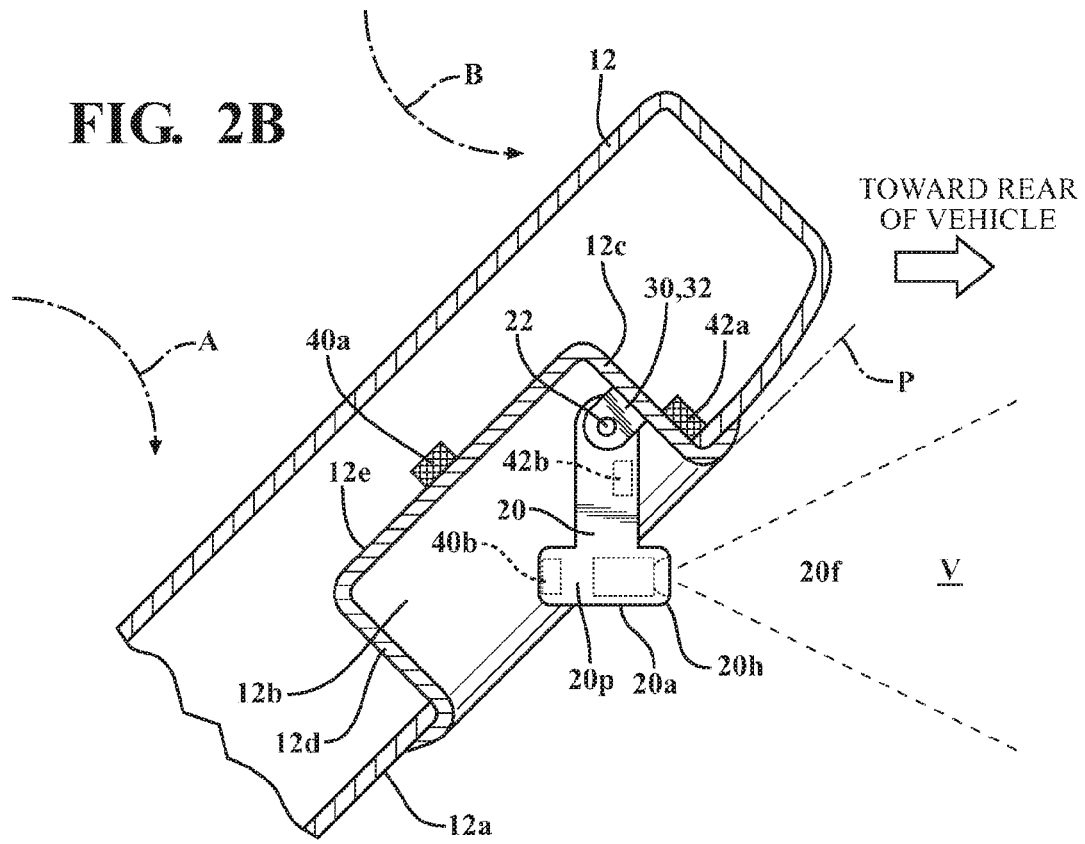
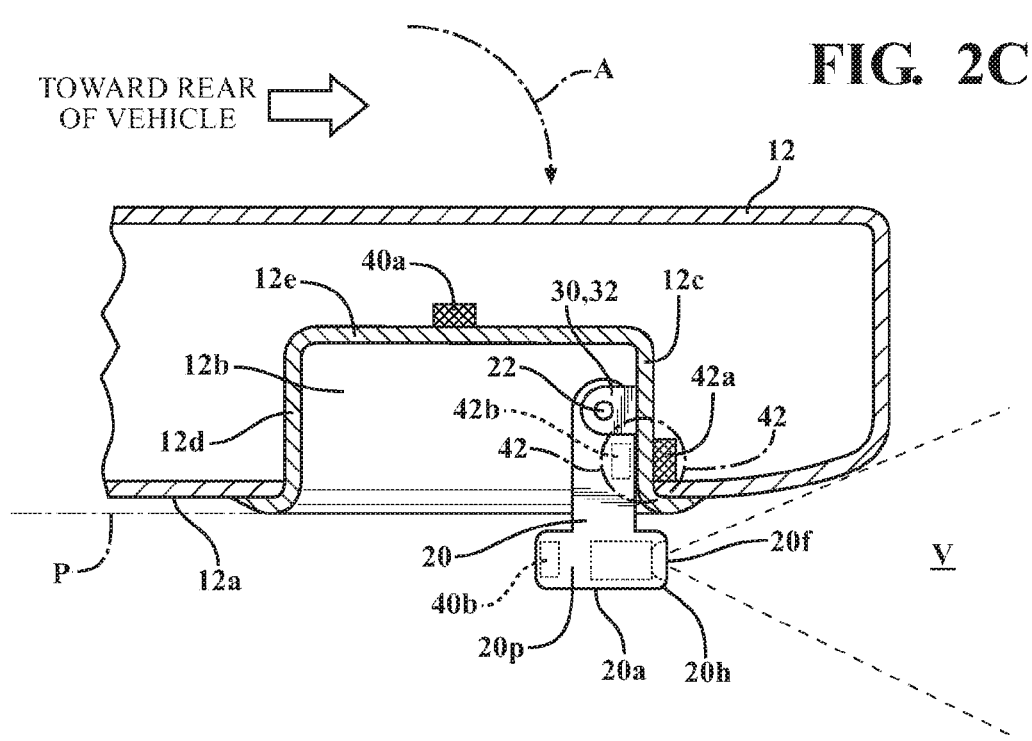

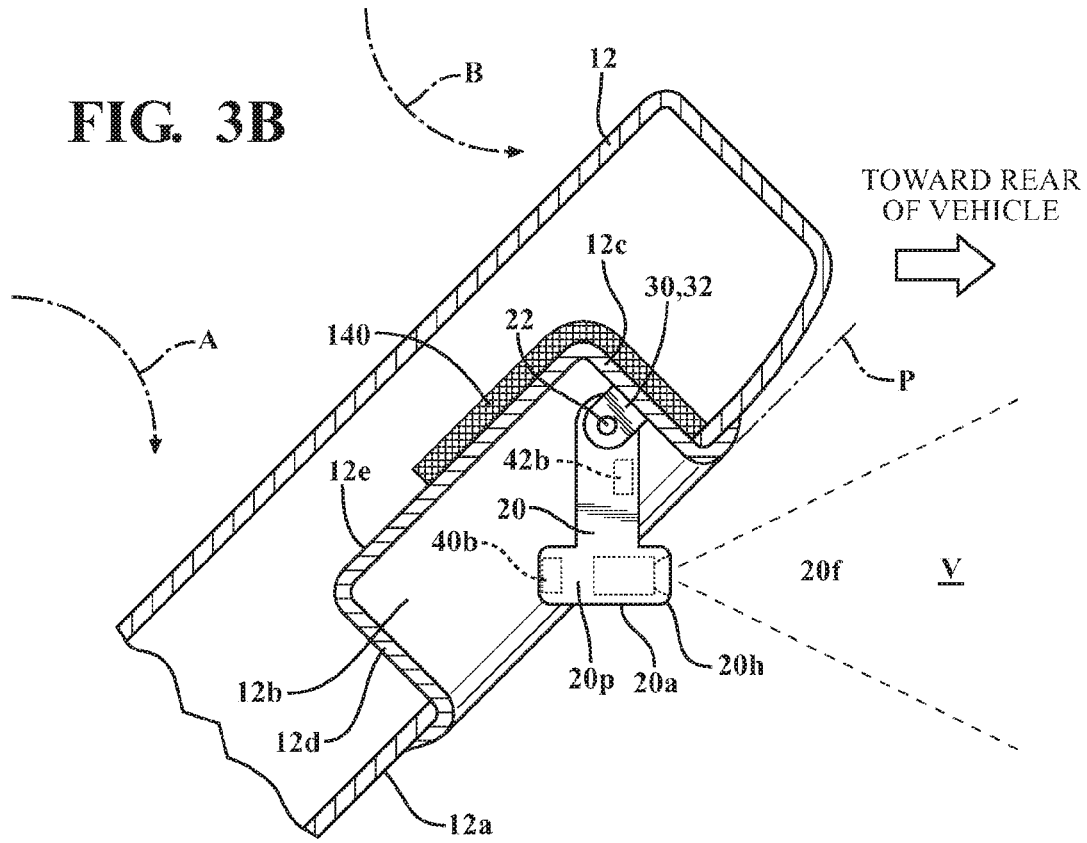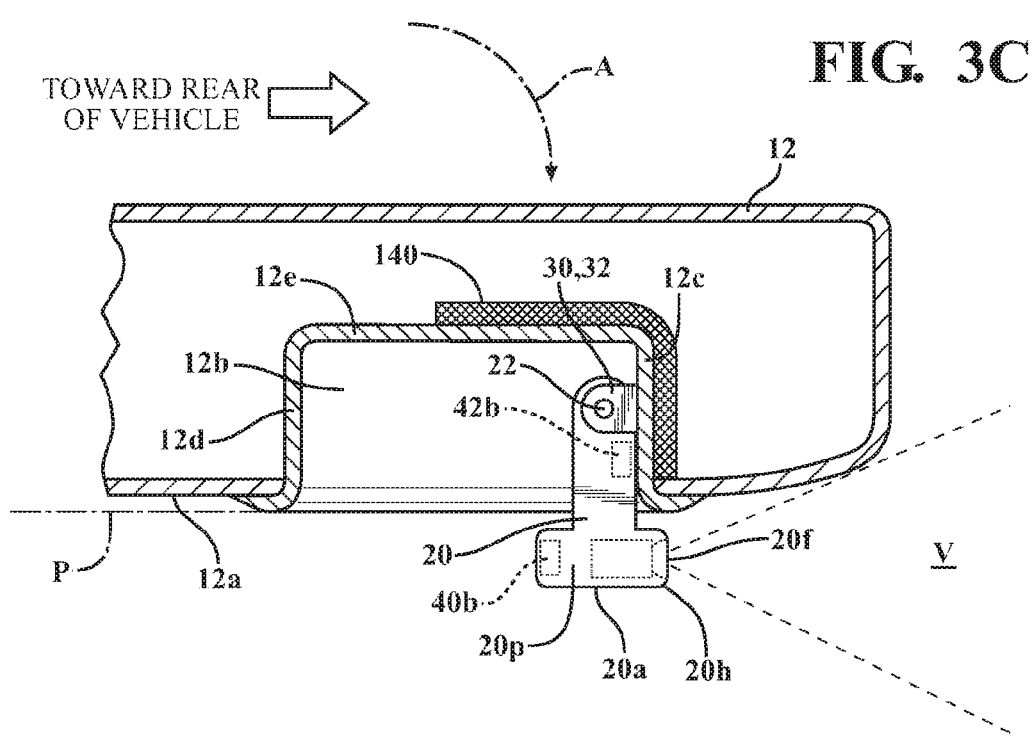

GRAVITY MOUNT AND ROTATIONAL SECUREMENT FOR SENSING ELEMENT

TECHNICAL FIELD

Aspects of the disclosure generally relate to orientation control and stabilization of vehicle sensors.

BACKGROUND

Many modern vehicles employ cameras or other sensors to help detect the presence of objects around the vehicle that are normally difficult for the driver to see. Perhaps the most common example of this is the backup camera that is found in many vehicles to help a driver see the area around the rear bumper to avoid backing the vehicle into an object or a person. Such a camera is particularly useful in large vehicles such as trucks or sport utility vehicles, in which the height of the vehicle from the ground as well as the presence of a tail gate or a swingable door makes it particularly difficult to see behind the vehicle due to the size and geometry of the vehicle. However, when mounted on a tailgate or swingable door, the field of view of the camera or sensor shifts from encompassing the area behind the vehicle as intended, to the ground or road proximate the rear of the vehicle. In this orientation, the sensor provides little if any coverage of the intended area behind the vehicle.

SUMMARY

In one aspect of the embodiments described herein, an apparatus structured for installation in a component of a vehicle is provided. The component is rotatable to any of a plurality of angular orientations relative to a remainder of the vehicle. The apparatus includes a sensing element and mounting means structured for coupling to the component so as to move with the component. The mounting means is also structured for operative coupling to the sensing element so as to enable free rotation of the sensing element with respect to the mounting means. Retention means is provided and is structured for coupling to the component. The retention means is operable to prevent rotation of the sensing element with respect to the mounting means.

In another aspect of the embodiments of the described herein, a vehicle is provided including a door rotatable between a first orientation and a second orientation relative to a remainder of the vehicle. A sensing element is rotatably coupled to the door so as to rotate freely with respect to the door, and so as to maintain a predetermined orientation with respect to the vehicle when the door is in the first orientation and when the door is in the second orientation. A retention mechanism is also coupled to the door. The retention mechanism is operable to prevent rotation of the sensing element with respect to the door when the door is in the first orientation and when the door is in the second orientation.

BRIEF DESCRIPTION OF THE DRAWINGS

FIG. 2B is the schematic cross sectional view of FIG. 2A showing the component is in a second angular orientation different from the first orientation.

FIG. 2C is the schematic cross sectional view of FIG. 2B showing the component is in a third angular orientation different from the first and second orientations.

FIG. 3B is the schematic cross sectional view of FIG. 3A showing the component is in a second angular orientation different from the first orientation.

FIG. 3C is the schematic cross sectional view of FIG. 3B showing the component is in a third angular orientation different from the first and second orientations.

DETAILED DESCRIPTION

The disclosure relates to a sensor mounting capable of self-adjusting its angular orientation with respect to a swingable door or tailgate of a vehicle so that the sensor continues to face in a desired direction, regardless of the angular orientation of the door on which it is mounted. In one example, the mounting enables a rear-facing sensing element (or sensor) mounted on a vehicle tailgate to rotate freely as the tailgate is rotated between closed (up) and open (down) configurations. This ensures that a sensing face of the sensor will face toward a rear or the vehicle regardless of the angular orientation of the tailgate. In addition, the apparatus includes one or more electromagnets mounted in the tailgate and configured for maintaining and stabilizing the sensor in a rear-facing orientation both when the tailgate is closed and when the tailgate is open. This prevents vibration or jostling of the freely-rotating sensor during driving.

Figure 1:
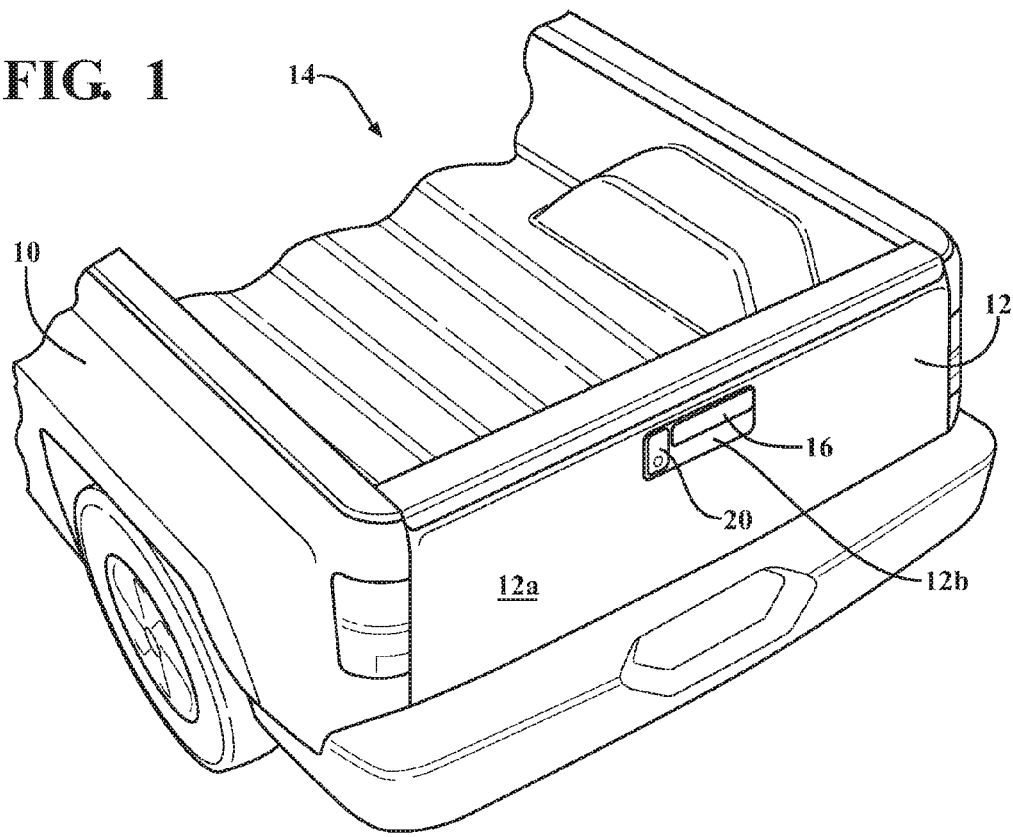
FIG. 1 is a schematic representation of a portion of a vehicle incorporating an-apparatus including a sensing element in accordance with one aspect of the invention.

FIG. 1 shows a rear portion of a vehicle 10 incorporating a gravity-oriented sensing element in accordance with an embodiment described herein. The vehicle 10 includes a number of components including a component 12, which is most commonly envisioned as a swingable or rotatable rear door, tail gate, or lift gate, although it should not be limited thereto. In embodiment shown in FIG. 1, vehicle 10 is in the form of a pickup truck and component 12 is in the form of a tailgate providing access to a bed 14 of the pickup truck 100. Tailgate 12 is rotatably attached to the body or frame of the vehicle 10 so as to be movable between multiple component angular orientations relative to the body or frame. For example, the tailgate may be movable between an up, closed orientation (shown in FIGS. 1, 2A, and 3A) in which the tail gate is latched to the body of the vehicle 10 to close the bed of the vehicle 10 and a down, open orientation (shown in FIGS. 2C and 3C) in which the tail gate has been unlatched and dropped approximately 90 degrees to provide better access to the truck bed for loading and unloading.

In a rearward-facing surface 12a of the tailgate, a cavity 12b is formed which houses a handle assembly 16 that can be actuated in order to unlatch the tailgate 12 when it is opened, in a manner known in the art. A sensing element 20 is also mounted inside the cavity 12b where a user's hand would enter to grasp and lift the handle assembly 16. In some embodiments, the sensing element 20 is a camera unit, such as a backup camera configured to face the rear of the vehicle. However, the sensing element 16 might also be another type of sensor. For example, the sensing element may be a sensor selected from the group consisting of infrared sensors, lasers, Doppler sensors, radar, radio frequency sensors, microwave sensors, and optical sensors. Moreover, it is contemplated that there may be more than one sensing element or types of sensing element mounted in a given freely rotatable housing as described herein, and that these sensing elements may be used together to form a composite image. For example, the sensing elements might include a camera and infrared sensor and the combined data may be used to form a composite image for the driver providing both visual and heat map data. As another example multiple sensing elements may be implemented at different positions to perform functions such as, for example, calculating the distance to an object.

Sensing element 20 is rotatably coupled to the component 12 in a manner such that the angular or rotational orientation of the sensing element 20 with respect to the remainder of the vehicle remains the same responsive to rotation of the component 12. In a particular embodiment, sensing element 16 is coupled to the tailgate 12 by a hinge mechanism structured to permit the sensing element to swing or rotate freely about the hinge mechanism responsive to rotation of the tailgate 12 during opening. Sensing element 20 may also be suitably weighted or otherwise structured so that its weight distribution causes a sensing face 20f of the sensing element to remain in a rear-facing orientation during rotation of the tailgate 12 from an "up" or closed configuration to a "down" or open configuration. A sensing face 20f of the sensing element 20 is a face or side of the sensing element through which the sensing function is performed (for example, in a camera, a face or side of the sensing element containing the camera lens). For example, in the embodiment shown in FIGS. 2A-2C, the sensing element is structured so that its center of gravity is as low as possible (for example, by making a lowermost portion 20a of the sensing element 20 heavier than other portions of the sensing element), so that the weight distribution of the element causes the element lowermost portion 20a to always rotate downward due to gravity.

Figure 2A:
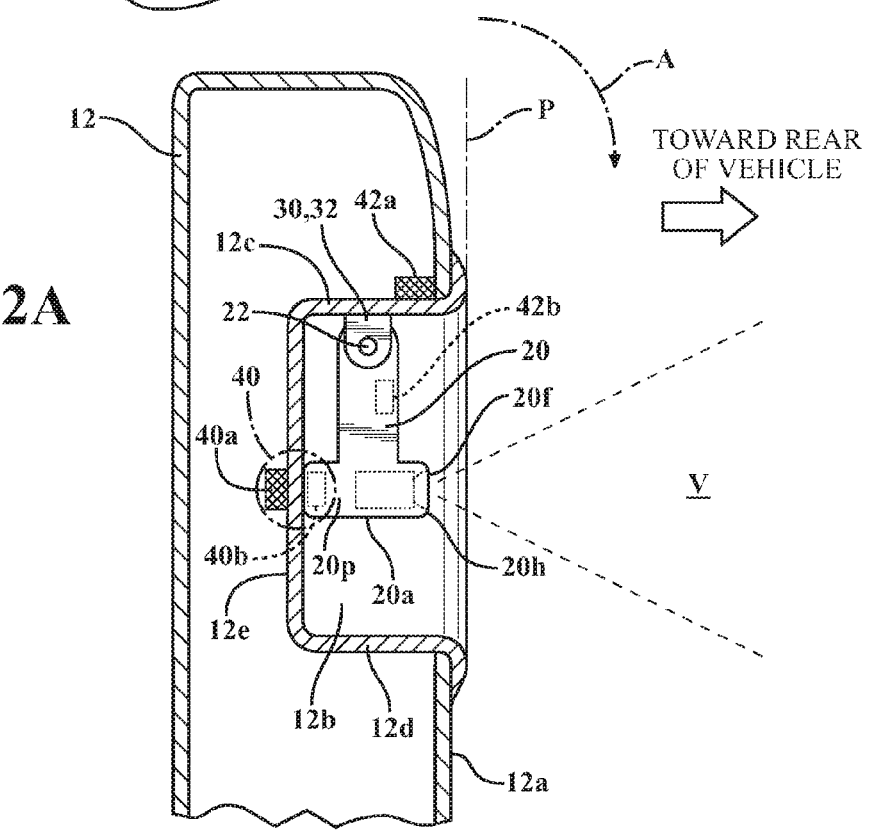
FIG. 2A is a schematic cross sectional view of a component including an apparatus in accordance with an embodiment described herein, where the component is in a first angular orientation.

As shown in FIG. 2A, the sensing face 20f may be spaced apart a distance D from a plane P defined by a rear-most edge or portion of the cavity 12b. This recesses the sensing face 20f within the cavity 12b, to aid in protecting the sensing element from damage. In one embodiment, the sensing element mounting mechanism is in the form of a shaft or pin 22 extending through the sensing element and also between a pair of opposed ears 30, 32 projecting from a side 12c of the cavity 12b. However, the mechanism may also have other, alternative forms.

FIGS. 2A-2C show the orientation of the sensing element 20 in various configurations of the tailgate 12 as it is lowered or rotated in direction "A", from the closed configuration (FIG. 2A) to an intermediate configuration (FIG. 2B), then to the open configuration (FIG. 2C). As the tailgate 12 is rotated downward in direction "A", the sensing element 20 correspondingly rotates in direction "B" (FIG. 2B) opposite direction "A". Thus, throughout rotation of the tailgate 12 and when the tailgate has been completely opened as shown in FIG. 2C, the sensing face 20f of sensing element 20 retains its rear-facing orientation.

Also, it may be seen that a field of detection V of the sensing element 20 (for example, a field of view of a camera) remains oriented toward the rear of the vehicle while dropping from a position spaced a relatively greater distance from the road (FIG. 2A) to a position higher position spaced a relatively smaller distance from the road (FIG. 2C).

Any wires (not shown) operatively connecting the sensing element 20 to the remainder of the vehicle may be structured and/or arranged so as to provide as little drag or resistance as possible to the rotation of the sensing element 20 as the tailgate is rotated. In a particular embodiment, wires electrically coupling the sensing element 20 to the remainder of the vehicle are passed through shaft 22 on which the sensing element 20 is rotatably mounted, to aid in minimizing drag and impediments to motion along exterior surfaces of the sensing element.

As the sensing element is freely-rotatable on shaft 22, the sensing element may rotate or vibrate during vehicle movement unless constrained. To aid in stabilizing the sensing element 20 and maintaining its desired rear-facing orientation during vehicle movement, one or more actuatable locking or retention mechanisms may be incorporated into or operatively coupled to the tailgate 12. In one embodiment, each retention mechanism is in the form of a conventional electromagnetic (EM) locking mechanism. FIGS. 2A-2C show an embodiment with two spaced-apart EM locking mechanisms 40 and 42.

Mechanism 40 is configured to lock or secure the sensing element 20 in the rear-facing orientation when the tailgate is up, and mechanism 42 is configured to lock or secure the sensing element 20 in the rear-facing orientation when the tailgate is down.

Mechanism 40 includes a first electromagnet 40a mounted inside or along a wall 12e of cavity 12b, and a first metallic or otherwise magnetically attractive element 40b incorporated into sensing element 20 and positioned adjacent (or in contact with) the magnet 40a. In one embodiment, the first magnetically attractive element 40b is an armature plate affixed to a housing 20h of the sensing element. In another embodiment, the sensing element housing 20h (or a portion thereof) is formed from a metallic or other material that is attracted to the magnet 40a when it is energized, and the portion of the housing serves as the magnetically attractive element 40b.

Mechanism 42 includes a second electromagnet 42a mounted inside or along a wall 12c of cavity 12b, and a second metallic or otherwise magnetically attractive element 42b incorporated into sensing element 20 and positioned adjacent (or in contact with) the magnet 42a. In one embodiment, the magnetically attractive element 42b is an armature plate affixed to a housing 20h of the sensing element. In another embodiment, the sensing element housing (or a portion thereof) is formed from a metallic or other material that is attracted to the magnets 42a when it is energized, and a portion of the housing serves as the magnetically attractive element 42b.

Electromagnets 40a and 42a are electrically coupled to a voltage source in the vehicle for energization, in a manner known in the art. Either of the retention mechanisms 40 and 42 and the associated electromagnets 40a and 42a is considered to be activated when the magnets are energized (i.e., when the engine is turned on and electric current flows to the associated magnet(s)). Any magnet and magnetically attractive elements used should have as little residual magnetism as possible when the electromagnet is de-energized, to help ensure that the sensing element 20 will rotate freely without undesirable interference from the magnets 40a and 42a even when non-energized. Thus, the magnet(s) 40a and 42a will secure the sensing element in the rear-facing orientation when the tailgate is up and also when the tailgate is down, whenever the magnet(s) are energized.

In the embodiment shown in FIGS. 2A-2C, sensing element 20 includes a projection 20p incorporating the magnetically attractive element and extending toward the cavity wall 12e. The projection is structured to touch the wall 12e or to be spaced a small enough distance from the wall the tailgate is in the "up" position, so that energization of the magnet 40a will draw the projection 20p into contact with the magnet (or with the portion of the wall 12e adjacent the magnet), thereby securing the sensing element in the orientation shown in FIG. 2A. Contact between the sensing element 20 and the magnet 40a (and/or the wall 12e) is thus maintained while the magnet 40a is energized. Alternatively, magnet 40a may project or extend outwardly from wall 12e so that it touches or lies closely adjacent to the magnetically attractive portion 40b of the sensing element 20.

Alternatively, the side 12e of the cavity containing the magnet 40a and/or the portion of sensing element housing 20h adjacent the magnet 40a and containing the magnetically attractive element 40b may be otherwise shaped or contoured so as to contact each other (or so as to provide a small clearance between the parts) when the tailgate is in the "up" position and the sensing element 20 is in the rotational configuration shown in FIG. 2A. A variety of shapes or contours are contemplated.

In the embodiment shown in FIGS. 2A-2C, cavity wall 12c has mounted inside or therealong the magnet 42a. the wall 12c and the portion of the sensing element 20 residing opposite the wall when the tailgate is down are structured to touch each other or to be spaced a small enough distance from each other that energization of the magnet 42a will draw the sensing element into contact with the magnet (or with the portion of the wall 12e adjacent the magnet), thereby securing the sensing element in the orientation shown in FIG. 2C. Contact between the sensing element 20 and the magnet 42a (and/or the wall 12c) is thus maintained while the magnet 42a is energized.

Alternatively, a portion of sensing element housing 20h including the magnetically attractive portion 42b may project or extend outwardly toward the sensing element 20 so that it touches or lies closely adjacent the magnet 42a positioned along the wall. Alternatively, the side 12c of the cavity containing the magnet 42a and/or the portion of sensing element housing 20h adjacent the magnet 42a and containing the magnetically attractive element 42b may be otherwise shaped or contoured so as to contact each other (or so as to provide a small clearance between the parts) when the tailgate is in the down position and the sensing element 20 is in the rotational configuration shown in FIG. 2C. A variety of configurations are contemplated.

The EM locks are configured so that, when the locks are electrically energized, the sensing element 20 is maintained by one of magnets 40a and 42a in one of the rear-facing configurations shown in FIGS. 2A and 2C. Thus, for example, an EM lock may be energized when the engine is running and the tailgate is either in the "up" (FIG. 2A) or "down" (FIG. 2C) position during vehicle movement.

The vehicle may be configured to energize both of magnets 40a and 42a whenever the vehicle engine is turned on. Alternatively, the magnet energization circuit may be configured so that only magnet 40a is energized when the tailgate 12 is in the up position (shown in FIG. 2A) and only magnet 42a is energized when the tailgate 12 is in the down position (shown in FIG. 2C). When the engine is turned off, neither of the magnets is energized. Thus, with the engine off, the tailgate may be raised or lowered and the sensing element will rotate freely so as to maintain the sensing face 20f in a rearward-facing orientation.

Figure 3A:
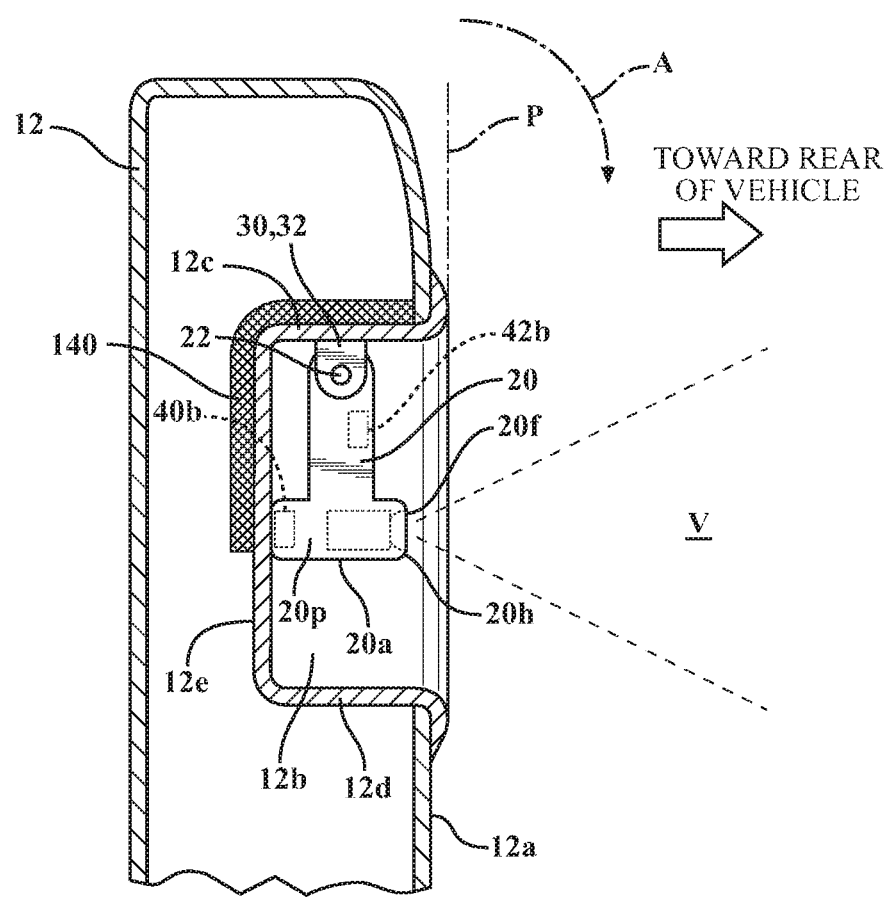
FIG. 3A is a schematic cross sectional view of a component including an apparatus in accordance with another embodiment described herein, where the component is in a first angular orientation.

FIGS. 3A-3C show an alternative embodiment in of the sensing element securement devices just described. In the embodiment shown, the sensing elements have the same configuration as that shown in FIGS. 2A-2C. However, for the securement mechanism, a single magnet 140 is employed rather than two separate magnets 40a and 42a. The magnet 140 is electrically coupled to a voltage source in the vehicle for energization, in a manner known in the art. As previously described, it is assumed that the sensing element 20 will be in one of the orientations shown in FIGS. 3A and 3C when the engine is started and the electromagnet 140 is activated.

If the magnet 140 is activated when the sensing element is in the orientation relative to the tailgate shown in FIG. 3A (i.e., when the tailgate is up), the sensing element 20 will be touching or spaced a small distance apart from the magnet 140, at the location of the first magnetically attractive element 40b or portion of sensing element housing 20h. In addition, when the sensing element is in this orientation, the second magnetically attractive element 42b or portion of sensing element housing 20h is much farther away from the magnet 140 than element 40b. Also, the location of element 40b is the closest movable portion of the sensing element positioned next to magnet 140. Therefore, when the tailgate is up and the magnet 140 is energized, the sensing element will immediately be drawn into contact with the magnet 140 (or wall 12e) at the location of element 40b.

Similarly, if the magnet 140 is activated when the sensing element is in the orientation relative to the tailgate shown in FIG. 3C (i.e., when the tailgate is down), the sensing element 20 will be touching or spaced a small distance apart from the magnet 140 at the location of the second magnetically attractive element 42b or portion of sensing element housing 20h. When the sensing element 20 is in this orientation, the first magnetically attractive element 40b or portion of sensing element housing 20h is much farther away from the magnet 140 than element 42b. Also, the location of element 42b is the closest movable portion of the sensing element positioned next to magnet 140. Therefore, when the tailgate is down and the magnet 140 is energized, the sensing element 20 will immediately be drawn into contact with the magnet 140 (or wall 12c) at the location of element 42b.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus structured for installation in a component of a vehicle, the component being rotatable to any of a plurality of angular orientations relative to a remainder of the vehicle, the apparatus comprising:
   a sensing element;
   mounting means structured for coupling to the component so as to move with the component, the mounting means also being structured for operative coupling to the sensing element so as to enable free rotation of the sensing element with respect to the mounting means; and
   retention means structured for coupling to the component, the retention means being operable to prevent rotation of the sensing element with respect to the mounting means.

2. The apparatus of claim 1 wherein the component is a swingable door of the vehicle.

3. The apparatus of claim 2 wherein the component is a tailgate.

4. The apparatus of claim 1 wherein the retention means comprises at least one electromagnet energizable to magnetically attract the sensing element.

5. The apparatus of claim 1 wherein the retention means comprises at least one electromagnet structured to engage a magnetically attractive element incorporated into the sensing element.

6. The apparatus of claim 4 wherein the at least one electromagnet comprises a first and a second electromagnets energizable to magnetically attract the sensing element.

7. The apparatus of claim 5 wherein the apparatus is configured to energize one of the first and second electromagnets so as magnetically attract the sensing element when the component is in a first angular orientation, and configured to energize the other one of the first and second electromagnets so as magnetically attract the sensing element when the component is in a second angular orientation different from the first orientation.

8. The apparatus of claim 4 wherein the magnetically attractive element comprises a portion of a housing of the sensing element.

9. The apparatus of claim 4 wherein the magnetically attractive element comprises an armature plate affixed to the sensing element.

10. The apparatus of claim 1 wherein the sensing element is a backup camera.

11. The apparatus of claim 1, wherein the sensing element is a sensor selected from the group consisting of infrared sensors, lasers, Doppler sensors, radar, radio frequency sensors, microwave sensors, and optical sensors.

12. A vehicle including an apparatus in accordance with claim 1.

13. A vehicle comprising:
a door rotatable between a first orientation and a second orientation relative to a remainder of the vehicle;
a sensing element rotatably coupled to the door so as to rotate freely with respect to the door, so as to maintain a predetermined orientation with respect to the vehicle when the door is in the first orientation and when the door is in the second orientation; and
a retention mechanism coupled to the door, the retention mechanism being operable to prevent rotation of the sensing element with respect to the door when the door is in the first orientation and when the door is in the second orientation.

14. The vehicle of claim 13 wherein the retention means comprises at least one electromagnet.

15. The vehicle of claim 14 wherein the retention means comprises at least one electromagnet structured to engage a magnetically attractive portion of the sensing element.

16. The vehicle of claim 15 wherein the at least one electromagnet comprises a first and a second electromagnets.

17. The vehicle of claim 15 wherein the magnetically attractive portion of the sensing element comprises a portion of a housing of the sensing element.

18. The vehicle of claim 15 wherein the magnetically attractive portion of the sensing element comprises an armature plate affixed to the sensing element.

* * * * *